Patented Feb. 6, 1923.

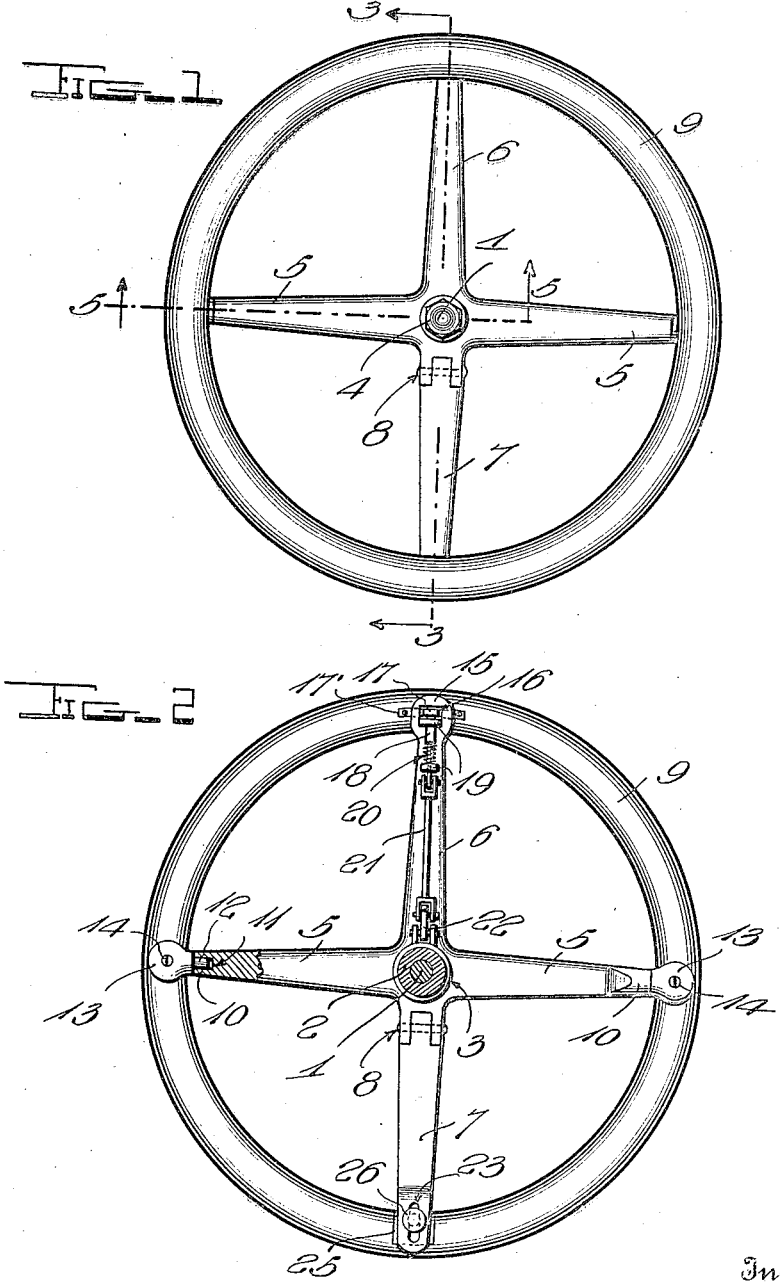

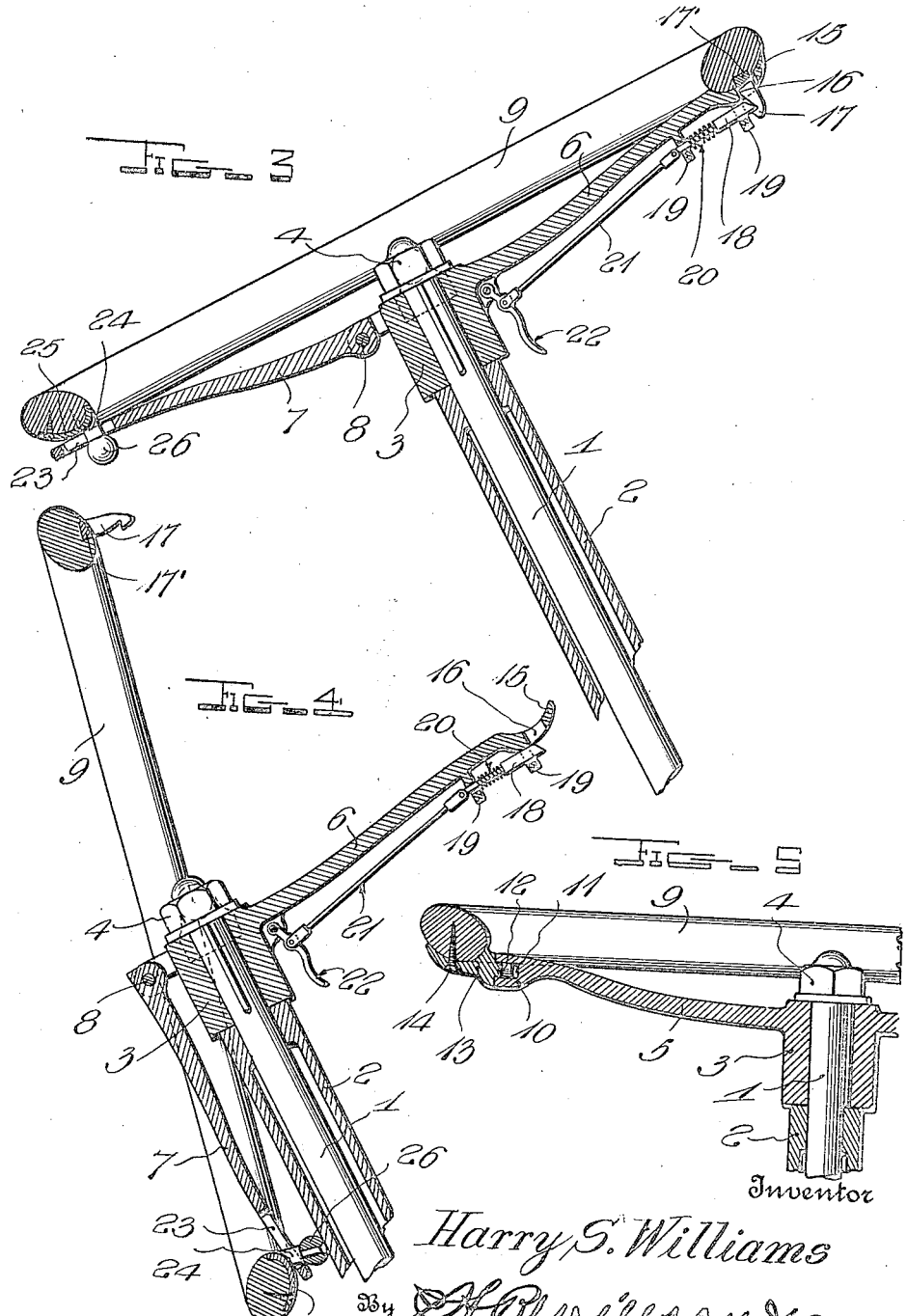

1,444,294

UNITED STATES PATENT OFFICE.

HARRY S. WILLIAMS, OF SAN ANTONIO, TEXAS, ASSIGNOR TO NOVEL WHEEL ASSOCIATION, OF SAN ANTONIO, TEXAS.

STEERING WHEEL.

Application filed January 10, 1921. Serial No. 436,269.

*To all whom it may concern:*

Be it known that I, HARRY S. WILLIAMS, a citizen of the United States, residing at San Antonio, in the county of Bexar and State of Texas, have invented certain new and useful Improvements in Steering Wheels; and I do declare the following to be a full, clear, and exact description of the invention such as will enable others skilled in the art to which it appertains, to make and use the same.

This invention relates to an improved steering wheel such as are used upon automobiles, and one object of the invention is to provide a steering wheel which may be tilted from a substantially horizontal position to a vertical position, the rim portion of the wheel being pivotally mounted across its diameter for tilting movement in the vertical direction and the rim being pivoted through connection with certain of the spokes and releasably held in a normal position.

Another object of the invention is to provide the wheel with an improved hub and spoke construction, certain of the spokes providing means for pivotally mounting the rim, one of the spokes being loosely connected with the rim for sliding movement across the rim and another spoke being releasably connected with the rim and when held in engagement therewith holding the rim against tilting movement.

Another object of the invention is to so construct this wheel that the spokes slidably and releasably connected with the rim may extend from the hub at right angles to the spokes pivotally mounting the rim.

Another object of the invention is to so construct this wheel that the spokes pivotally mounting the rim and the spokes releasably connected therewith may be rigid with the hub, the spokes slidably connected with the hub being positioned opposite the spokes releasably connected with the rim and pivotally connected with the hub.

Another object of the invention is to provide a steering wheel of the tilting type which will be strong and durable and very simple in construction.

This invention is illustrated in the accompanying drawings, wherein:

Figure 1 is a top plan view of the improved wheel.

Figure 2 is a bottom plan view of the improved wheel.

Figure 3 is an enlarged vertical sectional view taken along the line 3—3 of Fig. 1.

Figure 4 is a view similar to Fig. 3 showing the wheel in the tilted position.

Figure 5 is an enlarged sectional view taken along the line 5—5 of Fig. 1.

This improved wheel will be mounted upon the upper end portion of the steering post 1 above the casing 2, the upper end portion of the steering post 1 passing through the hub 3 of the wheel and the usual securing nut 4 being put in place to hold the wheel upon the steering post. This hub will be prevented from turning upon the post 1 by any conventional means desired. This hub is provided with radiating spokes 5 and 7, the spokes 5 and the spokes 6 being rigid with the hub and the spoke 7 having its inner end portion pivotally connected with the hub as shown at 8, so that when the rim 9 is tilted from the position shown in Fig. 3 to that of Fig. 4, the spoke 7 may swing vertically with the rim. The outer end portion of each of the spokes 5 is somewhat enlarged as shown at 10 in Fig. 5 and this enlarged end portion is formed to provide a socket 11 for receiving the pintle or pin extension 12 which extends from the bearing bracket or casting 13. This bearing bracket 13 is connected with the rim by a screw or other similar fastener 14 and it will thus be seen that when assembling the wheel, this assemblage can be easily accomplished by first inserting the pintle 12 into the socket 11 and then securing the bracket 13 to the underface of the rim by means of the fastener 14.

In order to releasably hold the rim against vertical tilting movement, the rigid spoke 6 which extends from one side of the hub at right angles to the spokes 5 has been provided with an enlarged head 15 which is cut to fit in close contact with the underface of the rim. This head 15 is provided with a passage 16 through which will pass the lug or hook 17 secured to the underface of the rim by screws or other similar fasteners which pass through the base portion 17' of the hook 17. A plunger latch 18 is slidably mounted in guiding eyes 19 positioned beneath the spoke 6 and is yieldably held in an extended or operative position as shown in Fig. 4 by means of a spring 20 positioned upon the plunger latch. A pull rod 21 is connected with the inner end portion of this plunger latch and this pull rod extends longitudinally of the spoke 6 and has its inner end portion connected with the trigger 22 which is positioned adjacent the hub and pivotally mounted so that when it is desired to release the rim, it is simply necessary to grasp the trigger and draw the same towards the hub or steering post. This movement will draw the plunger latch inwardly out of engagement with the hook extending through the opening 16 and the rim can then be tilted from the position of Fig. 3 to that of Fig. 4. The trigger can then be released and when the rim is returned to the position of Fig. 3, the hook through engagement with the bevelled end face of the plunger latch will move the latch to permit the hook to assume the position of Fig. 3 with the latch engaging the hook. As the rim turns upon its pivot, the spoke 7 which is positioned opposite the spoke 6 will swing vertically and in order to prevent binding which would prevent the rim from swinging freely, the outer end portion of this pivoted spoke 7 has been provided with a slot 23 through which passes the stem 24. This stem 24 is carried by a plate 25 secured to the underface of the rim, and this stem 24 is provided with a head 26 which will be put in place after the stem has been passed through the slot and will serve to prevent the stem from slipping out of the slot. It will thus be seen that the spoke 7 will be permitted of sliding movement across the rim so that the rim can swing freely but will be prevented from becoming disconnected from the rim. A tilting wheel has thus been provided which will be simple in construction and very efficient in operation.

I claim:

1. A steering wheel comprising a rim, a hub, opposed spokes extending from and rigid with said hub and having sockets in their outer ends, bearing elements carried by said rim, and having pintle extensions fitting into the sockets of said spokes to pivotally mount said rim, a spoke pivoted to said hub and having a slotted outer end portion, a pin connected with said rim and extending through the slot to limit sliding movement of the slotted spoke across said rim, a spoke carried by said hub in opposed relation to the pivoted spoke, and co-operating latching means carried by said rim and last mentioned spoke to hold the rim against tilting movement.

2. A steering wheel comprising a rim, a hub having rigid spokes connected with said rim to pivotally mount said rim and a pivoted spoke slidably connected with said rim, a spoke rigid with said hub and having its outer end portion slotted, an engaging element carried by said rim for extending through the slotted end of said rigid spoke, and a spring actuated latch carried by said slotted spoke to engage said engaging element and releasably hold the rim against tilting.

In testimony whereof I have hereunto set my hand.

HARRY S. WILLIAMS.